OR  3,885,861

United State
Farnsworth et al.

[11] 3,885,861
[45] May 27, 1975

[54] LIQUID CRYSTAL DIGITAL RETICLE

[75] Inventors: Robert P. Farnsworth; Lowell W. Hill, both of Los Angeles; Shi-Yin Wong, Santa Monica, all of Calif.

[73] Assignee: Hughes Aircraft Company, Culver City, Calif.

[22] Filed: June 5, 1974

[21] Appl. No.: 476,499

Related U.S. Application Data

[62] Division of Ser. No. 293,978, Oct. 2, 1972, abandoned.

[52] U.S. Cl. .............. 350/160 LC; 350/10; 356/252
[51] Int. Cl. ............................................... G02f 1/16
[58] Field of Search ........ 356/247, 252; 350/10, 11, 350/160 LC

[56] References Cited
UNITED STATES PATENTS

| | | | |
|---|---|---|---|
| 2,570,298 | 10/1951 | Wheeler.......................... | 356/252 X |
| 3,499,112 | 3/1970 | Heilmeier et al. ......... | 350/160 LC X |
| 3,581,002 | 5/1971 | Dodds....................... | 350/160 LC X |
| 3,703,331 | 11/1972 | Goldmacher et al..... | 350/160 LC X |

*Primary Examiner*—Edward S. Bauer
*Attorney, Agent, or Firm*—Paul H. Ware; W. H. MacAllister

[57] ABSTRACT

There is disclosed a liquid crystal digital reticle comprising a liquid crystal cell formed by two transparent plates of a material such as glass which are separated by a spacer around their edges and confine a liquid crystal material between them. The inside surface of each plate is provided with a plurality of transparent conductors laid down in an incremental pattern such as plurality of closely spaced parallel lines, the conductors on one plate extending horizontally and the conductors on the other plate extending vertically. The cell is positioned at a focal plane of the objective lens of a telescope or other optical sighting device. With no voltage applied, the glass plates and the liquid crystal material between them are transparent. When a voltage is applied between a switch selectable one of the vertical conductors and a switch selectable one of the horizontal conductors, not only the crystal material in the volume defined by the projective intersection points of the two conductors, but also portions of the material adjacent to such intersections on the entire length of each of the two selected conductors is activated to the dynamic scattering mode. The light scattering effect forms apparent lines in a cross-hair pattern against either light or dark backgrounds. The intersection point of these lines can be moved at will by appropriate matrix addressing techniques to select one horizontal and one vertical conductor. The mechanism by which energization of only two non-aligned conductors causes scattering along the length of both conductors is not fully understood but is believed to be due to a cross-coupling or "cross-talk" phenomenon.

1 Claim, 11 Drawing Figures

LIQUID CRYSTAL DIGITAL RETICLE

This is a division of application Ser. No. 293,978, filed Oct. 2, 1972, and now abandoned.

BACKGROUND OF THE INVENTION

1. Field of the Invention

This invention relates to a liquid crystal cell fabricated to serve as a digital reticle which is particularly useful as a moving reticle for any type of reticle application. It can, for example, be used to provide steering or aiming information in conjunction with weapons fire control systems, missile guidance systems, or the like. It is particularly applicable to, but not restricted to, a steering system associated with a strap-down seeker which system uses the moving reticle in conjunction with a laser designator and a fire control computer.

The general systems aspects of such an application for any kind of digital reticle is set forth in greater detail in an application filed simultaneously with this application entitled "Inertialess Digitally Adjustable Reticle" by C. F. Knapp Ser. No. 294,056, filed Oct. 2, 1973, and now abandoned which is assigned to the same assignee as this application. The liquid crystal reticle of the present invention can be used in the system disclosed therein or in any other application requiring an electrically actuable digital reticle.

2. Prior Art

Liquid crystal substances have been known as a scientific phenomenon since the 1890's. It is only in relatively recent years, however, that substances have been made available which operate as liquid crystals over a reasonable temperature range including room temperature. The first application of such more recent liquid crystal substances has been to the field of display devices of either the alpha-numeric type or the pictorial advertising type.

A general discussion of this subject was published in the April 1970 issue of the magazine "Scientific American" at page 100 in an article entitled "Liquid Crystal Display Devices" by George H. Heilmeier. A discussion of the application of these devices was published in the magazine "Electronics" at page 64 of the issue of July 6, 1970 in an article by Joseph A. Castellano.

Typical of the prior art patent literature are such U.S. Patents as U.S. Pat. No. 3,499,112 issued to G. H. Heilmeier on Mar. 3, 1970, U.S. Pat. No. 3,581,002 issued to W. J. Dodds on May 25, 1971, and U.S. Pat. No 3,647,280 issued to R. I. Klein on March 7, 1972.

The Heilmeier patent discloses a liquid crystal cell having two glass plates with a set of horizontal transparent conductors on one plate and a set of vertical tansparent conductors on the other plate. However, the actuating mechanism or circuitry for the cell is such as to apply voltages of a nature sufficient only to excite the intersection points of two of the conductors. These voltages are applied in rapid sequence to a program selectable set of such intersection points so that after the fashion of sweeping a raster in a TV picture, a picture may be generated by actuation in rapid sequence of a predetermined set of points. There is no discussion of cross-coupling nor any means for selecting only two conductors to activate all intersections under both with a single voltage to form the two cross-hairs in a reticle. The Kline patent illustrates a liquid crystal cell in which a cross pattern is displayed as a display design, but it is clearly of a dimension which precludes its use as a reticle. Furthermore, Kline uses layers or sheet conductors of transparent electrodes and dielectrics to define his images in a manner unrelated to the techniques of our invention. As in Heilmeier, Kline's intention is to form an image for display purposes.

In the Dodds patent a liquid crystal device is provided which is intended to form graticle patterns to be used over the face of a cathode ray tube. The problem to which this Dodds invention is directed is analogous to the problem solved herein, but the solution is entirely different and could not be used in a device where spacing between switch selectable reticle positions is as small as is necessary for reticle purposes. The Dodds structure puts both vertical and horizontal conductors on one plate and uses the other plate as a common return by providing a sheet conductor electrode thereon. Such a structure requires a transparent layer of insulating dielectric at each point where a horizontal graticle line crosses a vertical graticle line. Such insulation is difficult to manufacture and becomes increasingly difficult as the spacing between lines decreases. The insulating layer must be wider than the conductive layer in order to be effective. This sets a limit on the conductor spacing and produces discontinuities in the line pattern where a large number of fine lines is used to an extent that would destroy the effectiveness of a line being used as a sighting reticle. The Dodds device is suitable for defining a measuring scale on the face of a cathode ray tube or the coordinates of latitude and longitude thereon, which is his intended function, but it is not practical for use in a digitally adjustable reticle for sighting on a target through a telescope or other optical system. Again, Dodds has no teaching of the cross-coupling or cross-talk phenomenon in a liquid cell which makes possible applicant's solution to the problem of producing a digitally adjustable reticle with such a cell.

SUMMARY OF THE INVENTION

In order to overcome the shortcomings of the prior art and provide a reticle which is adjustable in minute increments in a digital fashion, there is provided in a preferred exemplary embodiment a liquid crystal cell comprising two glass plates with a layer of liquid crystal material confined between them. The plates may, for example, be rectangular and be held in parallel spaced relationship to each other by a mylar or other spacer. One of the plates has a plurality of fine transparent conductors arranged parallel to each other and extending in a horizontal direction. The other plate has on it a similar plurality of parallel transparent conductors extending in a vertical direction. Circuit means are provided for applying a voltage between one of the horizontal conductors and one of the vertical conductors. The liquid crystal cell is positioned on and orthogonal to the optical axis of a target sighting device having an objective lens and a detector such as an eyepiece lens and is preferably located at one of the focal planes of the objective lens system.

As the magnitude of the voltage applied between the conductors is increased, it has been found that one first comes to a threshold valve below which no scattering at any point in the plate occurs. As this threshold value is exceeded, the liquid crystal film in the volume defined by the intersection of the orthogonal projections of the two orthogonally disposed individually energized electrode strips is affected by the voltage. The current now flowing in it is sufficient to cause turbulence in the film in this volume. As the voltage is further increased between the same two electrodes, however, the film in the volume defined by the intersections of each of the energized electrodes with all of the other non-energized electrodes on the opposite plate also has turbulence induced in it and scattering is also caused in these volumes. The effect is to form a series of points of turbulence along each of the energized electrodes in a cross-hair pattern which when the electrodes are closely spaced has the appearance of a continuous line to the naked eye. In this manner, it is possible to define a cross-hair reticle pattern and to move either or both lines at will and to move them by known digital increments in response to binary electronic switching comands. Utilization of the cross-coupling or "cross-talk" mode of actuation permits the formation of intersection reticle lines in a single two plate liquid crystal cell without requiring insulation at crossover points.

BRIEF DESCRIPTION OF THE DRAWINGS

These and other objects, advantages, and features of the invention will be more apparent from the following detailed description of a preferred embodiment taken in connection with the accompanying drawings in which like reference characters are used to refer to like parts throughout and wherein.

DETAILED DESCRIPTION OF A PREFERRED EMBODIMENT

Figure 1:
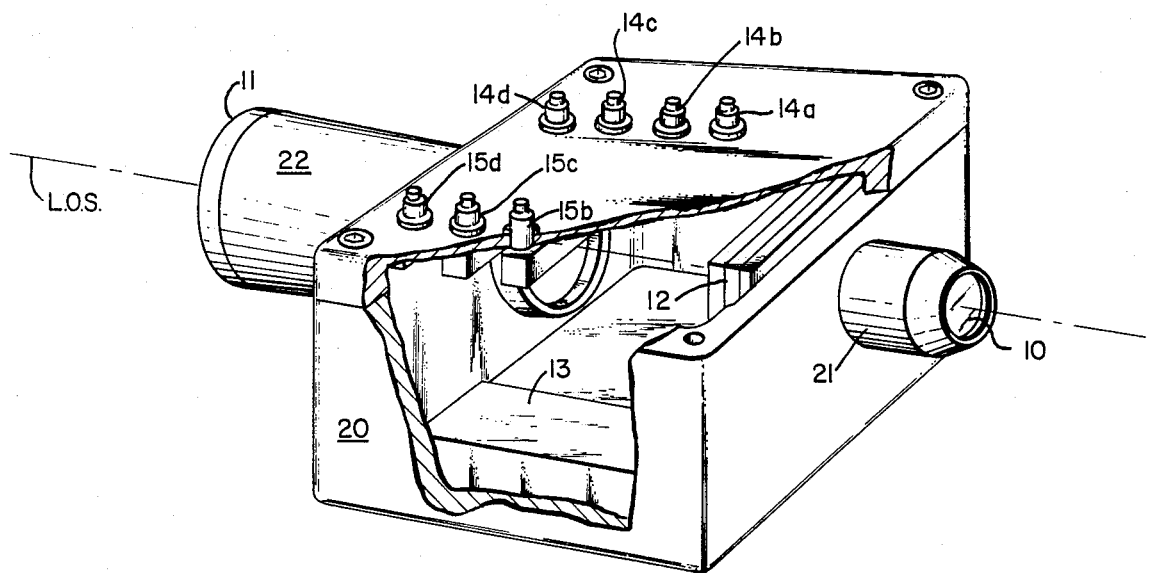
FIG. 1 is a partially broken away perspective view of a prototype target sighting telescope embodying the electronically actuated digital reticle of this invention.
Figure 2:
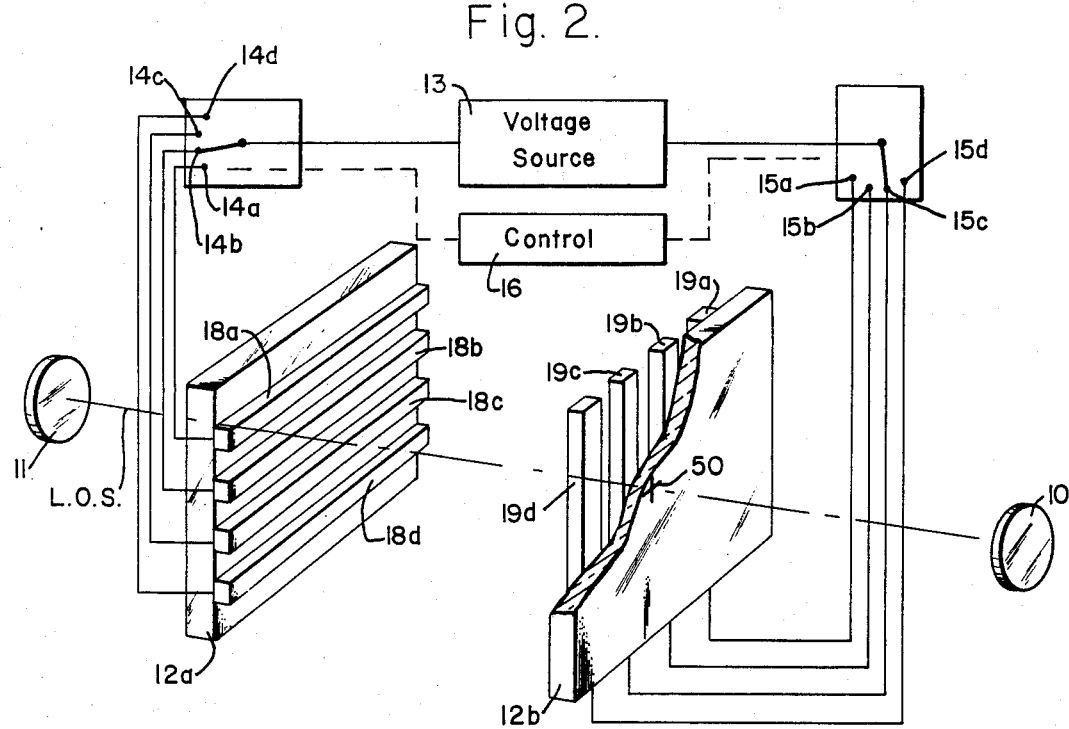
FIG. 2 is an electrical and optical diagrammatic view of the system of FIG. 1 showing the optical parts in exploded relationship.

Turning now to the drawings, there is shown in FIG. 1 a cutaway perspective view of a prototype sighting telescope which embodies the present invention in a system having the relationship diagrammatically illustrated in FIG. 2. It will be noted that the telescope optical system includes an eyepiece lens 10 and an objective lens or lens system 11 both positioned on an optical axis indicated in FIG. 2 by the dashed line showing the line of sight (hereinafter LOS). The liquid crystal reticle cell 12 is also positioned on the optical axis and is at one of the focal planes of the objective lens 11, which, of course, is also a focal plane of the eyepiece when a lens is used as a detector.

A battery or other voltage source 13 is connected to a first set of switches 14a, 14b, 14c, and 14d any one or more of which may be closed either by manual operation as in FIG. 1 or under the control of a control device or actuating circuit 16. Closing any one of the switches 14a, 14b, 14c, or 14d connects the voltage source to the correspondingly connected one of the horizontal transparent conductors 18a, 18b, 18c, or 18d respectively on the front glass plate 12a of the liquid crystal cell 12. A similar set of switches 15a, 15b, 15c, and 15d is connected in circuit relationship between the other pole of the voltage source 13 and the vertical conductors on the rear plate 12b of the liquid crystal reticle cell 12. Closing any one of the switches 15a, 15b, 15c, or 15d thus connects the voltage source 13 to the selected one of the transparent vertical conductors 19a, 19b, 19c, or 19d of the inner surface of the rear plate 12b of the cell.

As may be seen in FIG. 1 the liquid crystal reticle cell 12 is conveniently mounted in front of an aperture in the rear wall of a generally cubical hollow housing 20. A lens barrel 21 is received into this aperture and protrudes outside of the housing 20 to support the eyepiece lens 12. Similarly, a lens barrel 22 is received in an aperture in the forward wall of the housing 20 and supports the objective lens 11 in a relationship to the liquid crystal reticle 12 and eyepiece lens 10 such as to position all three of these optical elements on the common optical axis LOS. The voltage source in the prototype shown in FIG. 1 is a battery 13. The switches are simply two sets of four manual pushbutton switches mounted through the top of the housing 20. The wiring connecting the battery 13 to the switches and to the conductors in the liquid crystal cell is not shown in FIG. 1 for clarity of illustration, but is of course contained inside the housing 20 and connected in the manner indicated diagrammatically in FIG. 2.

Figure 3:
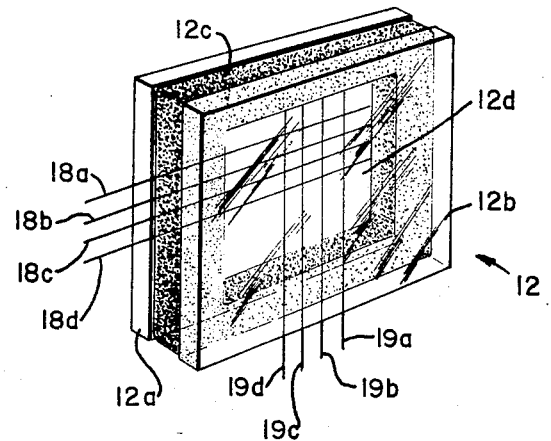
FIG. 3 is a detailed perspective view of the liquid crystal reticle cell.

In FIG. 3 there is shown a cutaway perspective view which gives constructional detail of the liquid crystal cell 12 in its assembled form. It will be noted that the glass plates 12a and 12b are positioned in spaced parallel opposed relationship by a spacer member 12c which is conveniently made of mylar or a similar plastic material. The spacer member 12c has a central aperture 12d in which liquid crystal material is confined and within which the actively used "projective intersection" points of the transparent conductors occur. When speaking of two lines or two conductors each of which is respectively in one of two parallel spaced planes, such as the opposed faces of the glass plates 12a, and 12b, it is convenient in this application to define the term "projective intersection" to mean the points in both planes at which an actual intersection of the two lines or conductors would occur if both conductors were in fact in the same plane and to refer to the "projective intersection volume" as being the line connecting the two projective intersection points in each of the planes or, where the points have actual physical dimension such as that of a conductor, then the volume of the shaft or solid line connecting these intersections.

Thus, it will be noted from FIGS. 2, 3, 4a, and 4b that the horizontal conductors on plate 12a and the vertical conductors on plate 12b never actually or physically intersect any of the other conductors either in their own set or in the orthogonal set on the other plate. For example, in FIGS. 2 and 3 it will be seen that the horizontal conductors 18a, 18b, 18c, and 18d are respectively connected through switches 14a, 14b, 14c, and 14d to one side of voltage source 13. Similarly, the vertical conductors on plate 12b comprising the transparent conductors 19a, 19b, 19c, and 19d are each respectively connected through switches 15a, 15b, 15c, and 15d to the other side of the voltage source 13. The switching arrangement may be a single pole four position switch as illustrated in FIG. 2 for the simplest case where only one horizontal and one vertical conductor are to be actuated at a time, or the switching arrangement may be as illustrated in FIG. 1 wherein each of the switches is an independently actuatable switch such as a pushbutton switch so that more than one conductor at a time may be connected to a voltage source 13. Assuming for the moment, however, the FIG. 2 arrangement in which only one horizontal and one vertical conductor is connected to the voltage source, it will be seen that the circuit is in fact completed through the liquid crystal material 17 contained in the cell 12, and more particularly through the projective intersection volume thereof associated with the switch selected conductors.

Figure 4A:
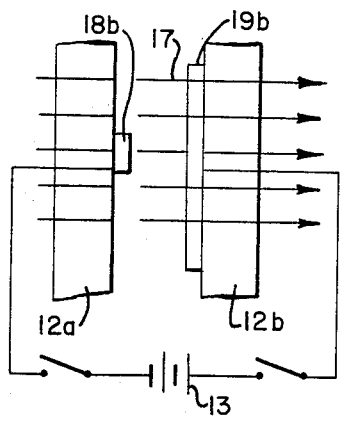
FIGS. 4a and 4b are fragmentary cross-sectional views illustrating one aspect of the operation of the cells in FIG. 3 wherein a single point at the intersection of two conductors is activated.
Figure 4B:
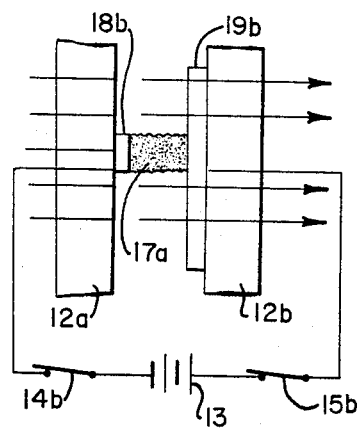

This conventionally recognized and simplest form of circuit completion is diagrammatically illustrated in FIGS. 4a and 4b. FIGS. 4a and 4b are diagrammatical sectional views through a portion of the liquid crystal cell illustrating the projective intersection concepts defined above. There is shown in FIG. 4a the horizontal conductor 18b on plate 12a and the vertical conductor 19b on plate 12b. The liquid crystal material 17 occupies the space between these conductors. Since in the circuit condition illustrated in FIG. 4a both switches are open, no current is flowing. When, as illustrated in FIG. 4b the switches 14b and 15b are closed, turbulence is induced in the area shaded and indicated as 17a in FIG. 4b. This turbulence occurs in the projective intersection volume of the cell as defined above when a so-called half voltage is applied between the transparent conductors. The projective intersection volume 17a may be visualized in its relationship to the rest of the conductor matrix pattern by reference to FIG. 5a at which the projective intersection of the conductors 18b and 19b is shown darkened representing the turbulence induced in the projective intersection volume 17a.

Figure 5A:
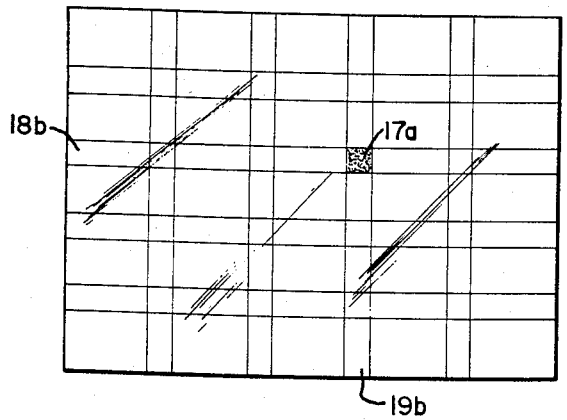
FIG. 5a is a plan view locating the point which is shown activated in the section view of FIG. 4b.
Figure 7:
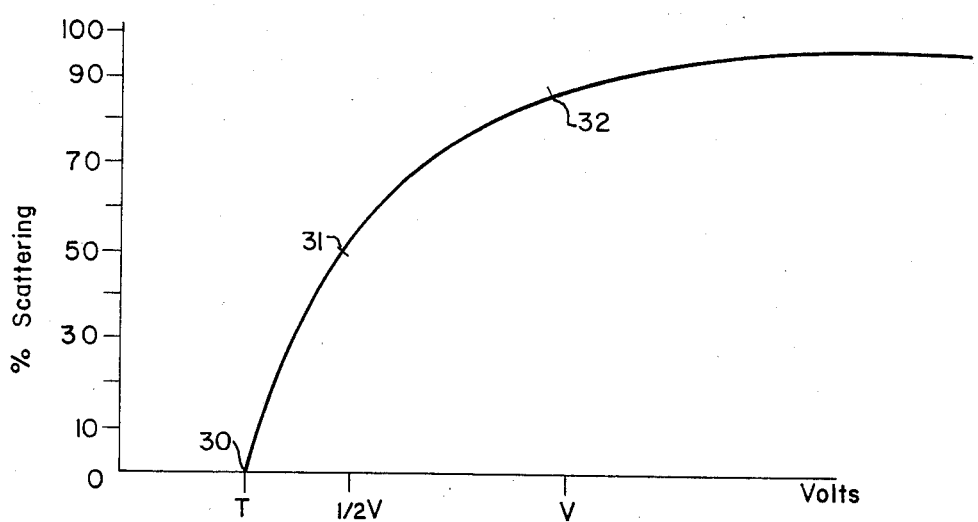
FIG. 7 is a graph of scattering in the liquid crystal plotted as ordinate against the magnitude of the voltage plotted as abscissa to define the operating characteristics of the cell.

In FIG. 7 there is illustrated the concept of the half voltage necessary to cause this turbulence which results in light scattering in the otherwise transparent liquid crystal material. The magnitude of this half voltage depends upon factors which include the particular liquid crystal material used, upon its thickness, and to some extent upon the width of the transparent conductors. In one exemplary embodiment of the liquid crystal reticle the particular liquid crystal material used was parametehoxybenzylidene-para-n-butyl-aniline (commonly called "M.B.B.A.") doped with n-methylbisctyldecylamine. It is known that this material so doped operates as described herein. It is believed that most nematic liquid crystal materials which exhibit dynamic scattering (which typically have resistivities of the order of $10^8$ ohm-centimeters) also exhibit the cross-talk or cross-coupling utilized herein. In FIG. 7 there is plotted a graph of the scattering versus voltage characteristics for this material. The applied voltage between the transparent conductors for a film sample having a thickness of 12 microns at room temperature is plotted along the X axis or abscissa whereas the scattering induced in the liquid crystal material as a percentage of maximum possible saturation scattering is plotted on the Y axis coordinate. It will be noted that a threshold voltage, T, for this material occurs at point 30 on the curve. For voltages below this value no scattering is induced. As the applied voltage is gradually increased the scattering increases in a nonlinear fashion and asymptotically approaches a saturation or maximum level. Ninety percent of the asymptotic limit is indicated at point 32 and the voltage necessary to produce this scattering is referred to herein as a "full voltage," V. The voltage which results in 50% scattering as indicated by the point 31 on the curve is referred to as a "half voltage", ½ V. When a voltage equal to the half voltage value is applied between the conductors 18b and 19b as indicated in FIG. 4b scattering occurs only at the projective intersection volume of these two conductors as is illustrated in FIGS. 4b and 5a.

Figure 5B:
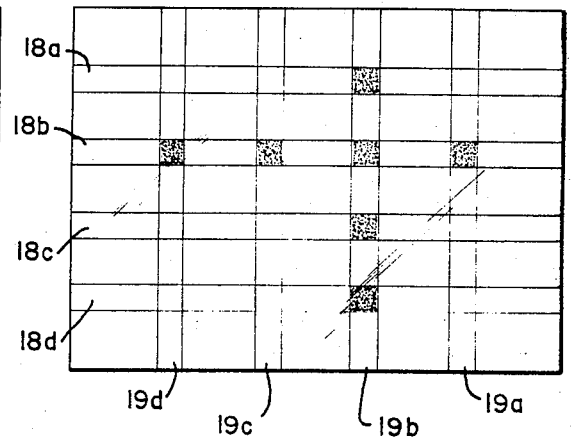
FIG. 5b is a plan view illustrating diagrammatically the location of points which may be activated by cross-coupling to form reticle cross-hair lines.

As the applied voltage begins to exceed the half voltage point 31, induced turbulence and scattering begins to occur at the projective intersection points shown darkened in FIG. 5b. This occurs without any change in the switching connections and with no direct conductor paths to one side of each of these points. It is thus believed that leakage conduction plays a role in this phenomenon. It will be noted that the darkened points in FIG. 5b comprise all of the projective intersection volumes of the energized horizontal conductor 18b not only with the energized vertical conductor 19b, but also with all other vertical conductors here shown as 19a, 19c, and 19d. Similarly, all of the projective intersection volumes of the energized vertical conductor 19b both with energized horizontal conductor 18b and with the other non-energized conductors 18a, 18c, and 18d show turbulence and scattering. The percentage of turbulence increases with the increase in voltage and is somewhat greater nearer the primary intersection of the conductors 18b and 19b which is the effective cross-hair intersection point.

One device comprising parallel glass plates having 25 micron wide transparent conductors orthogonally spaced 25 microns apart confining a film of the above-described exemplary nematic liquid crystal material having a thickness of one quarter mil (or about 6 microns since 1 mil is equal to 25.4 microns) when observed in a projection lamp optical system began to show cross-hair formation with as little as 10 volts applied. The cross-hair was exactly one line in each direction when only one line was energized in each direction.

The voltage source may be a battery putting out a DC voltage, but in practice it is preferred to preserve the lifetime of the liquid crystal by using an AC voltage. In the exemplary cell, this voltage was applied across a film of the above specified nematic liquid crystal material having a thickness of 6 microns between the opposed conductors. That is to say, the length of the projective intersection volumes was 6 microns. The transparent conductors were each 25 microns in width with 25 micron spacing between them and consisted of indium oxide coatings of the type used in coating glass with transparent conductors and sold by the Pittsburg Plate Glass Co. under their registered trademark "NESATRON." The transparent conductors may alternatively be tin oxide, or any other suitable conductive transparent film. Either a DC or AC voltage applied to these conductors will result in conduction currents in the liquid crystal material. One possible mode of considering the mechanism of the cross coupling or cross talk illustrated in FIG. 5b is to consider each plate as a ground plane or common return for the total energized conductor on the opposite plate. Another way of regarding this phenomenon is to consider that the boundary between each plate and the liquid crystal film provides a leakage path. In plate 12a the electric potential will be a maximum at the energized transparent conductor and will taper off gradually as one proceeds orthogonally away from any point on the energized conductor, that is, as one proceeds in vertical directions. Analogously, the energized conductor 19b which is in a vertical position in plate 12b is an equipotential surface from which leakage paths extend along the boundary between the film and the surface of plate 12b. The potential thus tapers off from the energized conductor in a uniform manner as one proceeds horizontally in either direction. The total potential between conductors on the plates due to this combined effect is thus such that only along the equipotential energized conductors on each of the two plates is there a sufficient voltage difference as one increases the voltage beyond the half voltage point to induce turbulence and hence scattering as shown in FIG. 5b.

As noted above, one particular cell studied used doped MBBA as the liquid crystal material. Many other nematic liquid crystal materials are, however, suitable for use in this fashion. Any of the materials disclosed in the Heilmeier U.S. Pat. No. 3,499,112 which exhibit the dynamic scattering mode are, for example, suitable for use in this fashion. Many of these materials are operative over an 80° or 90° C. temperature range which may extend, for example, from 10° C. to 90° C. The MBBA material used herein is operative over a temperature range of 15° to 45° C. If a wider operating temperature range is required, as for example in gun emplacements in the Arctic, a DC heating current may be supplied either through the energized conductor itself or through separate transparent conductors on the outer surfaces of the glass plates. Of course, any other suitable heating means may also be used where necessary.

Figure 6A:
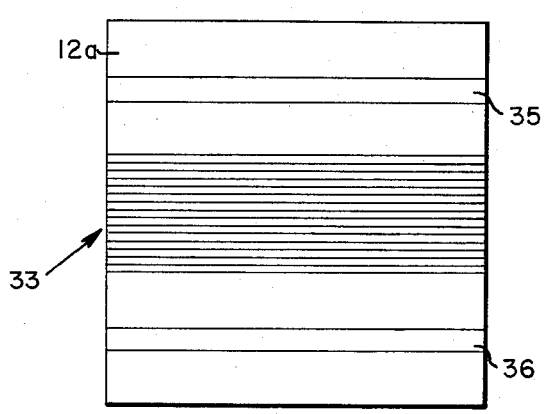
FIGS. 6a and 6b are plan views of opposite plates of a liquid crystal illustrating a particular pattern which was used in the prototype device of FIG. 1.
Figure 6B:
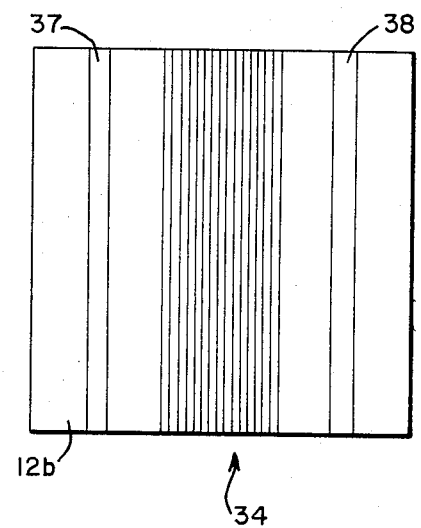

It will also be understood that the showing of four horizontal and four vertical conductors as in FIGS. 2, 3, 5a, and 5b is purely for purposes of simplifying the illustration. In the actual prototype shown in FIG. 1 the cell was provided with 64 horizontal lines and 64 vertical lines spaced as indicated above with 25 microns between lines of 25 microns width. A plan view more nearly illustrative of the actual plate 12a is shown in FIG. 6a and a similar plan view of 12b is shown in FIG. 6b. It will be noted that the central portion of the plate 12a contains the group 33 of 64 closely spaced conductors represented here by the parallel lines. Similarly, the central portion of the plate 12b contains the group 34 of closely spaced vertical conductors. For purposes of experimental analysis, two wider conductors 35 and 36 spaced from the central group 33 were provided on plate 12a and a similar pair of wider conductors 37 and 38 spaced from the central group 34 were provided on plate 12b. All projective intersection volumes formed by the superposition of these two patterns were found to behave in the same manner as discussed above in connection with FIGS. 5a and 5b. As the conductor width and spacing between conductors decreases, that is, as the number of conductors per inch increases, the cross coupling mode of operation results in scattering at a series of projective intersection points which are so closely spaced as to be indistinguishable from a solid line in reticle applications.

Other configurations of liquid crystal cells and optics suited for reticle use are of course possible. Two or more focal planes can be formed (as with relay optics) and a different liquid crystal cell can be placed at each focal plane. Alternatively, projection optics and a lighted liquid crystal cell can be used in the standard projected reticle fashion. If desired, even a reticle in the optical axis can be lighted for night use. Also, if desired, information other than the cross-hairs can be displayed in the reticle cell with straightforward liquid crystal display technology. Permanent lines such as a boresight defining fixed reticle, indicated schematically in FIG. 2 by the cross hair 50 on the outer surface of plate 12b at the point where the central line of sight LOS passes through it, can be provided on the same reticle as a zero reference. Other symbols can also be formed on the same reticle. Also, the eyepiece lens is, of course, only one of many possible detectors and may, for example, be replaced by a television camera or other photodetector in remote guidance applications such as missile control. A television camera and transmitter mounted in the nose cone of a missile and looking forward along the missile axis or velocity vector when provided with such a reticle and objective lens permits remote servo control of the missile flight path directly down to impact with moving targets if the reticle is provided with a permanent fixed cross hair defining the missile boresight or vector velocity direction and a moving reticle as described above for target selection and tracking. The digitally controlled (and hence measured) displacement of the moving reticle from the fixed cross hair directly provides an error signal for servo control of the missile direction. As the error is reduced, a remote operator viewing the transmitted television picture, including the two cross hairs, transmits binary signal commands to keep the movable reticle on the selected target. When both reticles are on the selected target the missile has the correct direction.

The advantages of the liquid crystal reticle are thus seen to be that it may be placed directly in the sight path of the optical system because in the unexcited state, it is transparent and colorless. It provides a moving reticle function without moving parts and without the heavy bulky equipment associated with other forms of moving reticles. It is also much more reliable than other forms of moving reticles. Alpha-numeric information or cueing symbols or the like can be incorporated in the same liquid crystal cell. The contrast between the lines and the background is excellent even in bright sunlight conditions whereas the contrast of an illuminated projected reticle becomes worse under bright light conditions. This advantage arises from the fact that the scattering causes loss of transmission of a fixed percentage of transmitted light or results in reflection of a fixed percentage of incident light, which percentage is independent of the level of illumination. The reflective properties permit the reticle to be lighted at night to give a light reticle on a dark background. The reticle is considerably cheaper to manufacture than other forms of moving reticles. It is inherently digital, which makes interface easier with digital range information and digital fire control computers. It has inherent digital accuracy and may be driven directly by electrical signals from digital circuitry without involving servo motors, digital to analog converters, or the like. The drive power required is very small and may be measured in milliwatts or less.

Analysis of the experimental prototype discussed above has shown that the nematic liquid crystal digital reticle cell operates as described to form single crosshair lines and that the cross-hairs so formed can be moved as the contacts are moved. It is essential to have precision switching arrangements, but state of the art technology is usable for this purpose. The cross-hair lines formed are black and sharp when viewed in the telescope system. They are substantially better than would have been expected from hypothetical consideration of heretofore observed liquid crystal scattering. The "lines" at first appear to be unbroken, full lines. Their true nature as individual squares is only apparent after close examination. The lines have excellent contrast over a wide range of ambient lighting including indoors, outdoors under foggy and full sun conditions, and in the evening against a city night sky. In daylight conditions the reticle appears to be light over dark parts of the background. The reticle lines get darker with increasing voltage. As noted above, they first appeared in the cell described above as the half voltage at about 10 volts was exceeded and increased in darkness up to 30 to 50 volts.

when two lines are energized so as to be operating side by side in the same direction, the current and/or electric field divides in such a way that two lines are "lighter," that is, provide less contrast and are less black than a single line in the orthogonal direction. The lines have sharp edges whether they cross over perpendicular lines of the same width or whether they cross the solid conductor areas. Out of the telescopic system the lines appear truly white. However, with just the short tube 22 restricting the light into the reticle from a forward cone,.the lines appear dark. The black lines appear to have light bands on either side. As noted above, the reticle may be driven in the sense of changing the particular line selected to be energized by electrical signals derived directly from digital circuitry without involving servo motors or other bulky apparatus.

Figure 8:
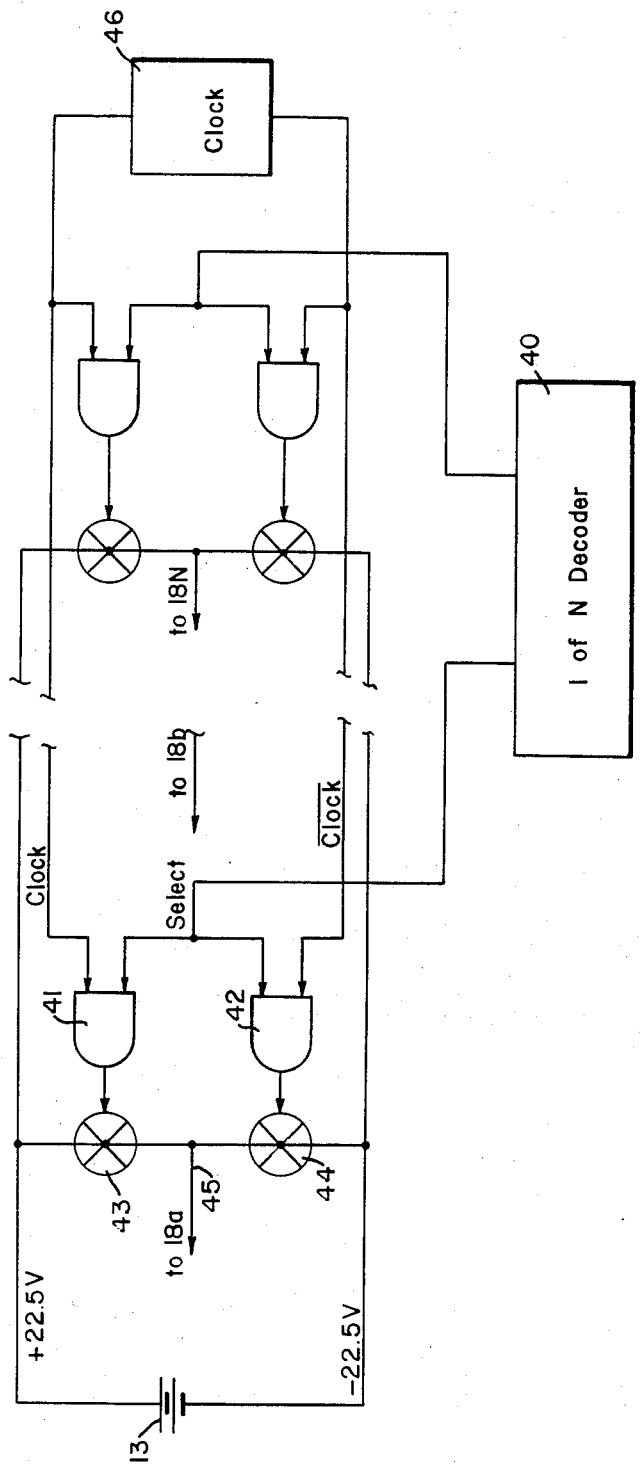
FIG. 8 is a circuit diagram of switching circuitry suitable for actuation of a liquid crystal reticle cell in accordance with the present invention.

By way of illustration of one suitable form of drive circuitry there is shown in FIG. 8 a typical switching circuit for the horizontal conductors 18a, 18b, etc. on plate 12a. A similar circuit (not shown) is connected to drive the vertical conductors on plate 12b and is identical to that shown except that the clock output is reversed in phase by 180° so as to produce an a-c signal across the projective intersection volume defined by the two selected conductors. In FIG. 8 it will be noted that a decoder 40 selects one of N of the horizontal transparent conductors 18a, 18b . . . 18N on plate 12a to be energized. The input signals to the decoder 40 comprise n binary digital inputs, where $2^n = N$, and may be derived from a fire control computer or any other suitable controlling circuitry. In order to control each conductor on the glass plate, there is provided for it a control stage comprising first and second AND gates such as 41 and 42 for the conductor 18a. The outputs of AND gates 41 and 42 are connected respectively to gating or switching circuits 43 and 44 which are connected in series across the power supply 13. Output to be applied to the conductor 18a is taken from the junction point between switches 43 and 44 over a conductor 45. The output signals from the AND gates 41 and 42 serve as "enable" signals to render one or the other of the gates 43 or 44 conductive. Each of the AND gates has as one of its inputs a signal derived from the clock circuit 46 which may, for example, be a multivibrator running at a frequency which is the desired frequency of the AC signal to be applied to the cell. The output of clock 46 is applied over the conductor labeled "clock" to AND gates 41 and over the conductor labeled "clock38 to AND gates 41 and over the conductor labeled "clock" to AND gate 42. The two signals are the inverse of each other, thus effectively being 180° out of phase to provide AC operation. The other input to each of the AND gates is the "select" input and is applied to them from one of the outputs of the decoder 40. That is to say, the select input is applied to only one of the N cascaded stages of which only two are shown in the broken circuit diagram of FIG. 8. The select input is applied continuously to one input of both of the AND gates of the selected stage as long as the position represented or controlled by that stage is desired for the reticle. The clock inputs are continuously applied in alternating polarity to the other inputs of each pair of AND gates. Thus, the gate 41 will have an output only while the select signal is being applied to it and during that time only while the clock signal is in appropriate polarity to produce an output. In the opposite polarity or phase of the clock signal AND gate 42 has an output. In this fashion the power supply 13, shown as a DC battery, serves to apply a voltage of alternating potential to the conductor selected by the select signal from the decoder 40. A circuit exactly like that shown in FIG. 8 is also used to control the vertical conductors on plate 12b and is connected across the same power supply 13 in parallel with the horizontal drive circuit. The pair of circuits are driven from the same clock with merely a phase reversal so that the total circuit drive through the liquid crystal cell will be a square wave of alternating potential and rigidly controlled frequency.

In this manner it will be seen that a reticle cross-hair can be generated and maintained at any electronically selected position within the field of the reticle cell with digital precision.

What is claimed is:

1. The method of operating a liquid crystal cell comprising the steps of:
   a. positioning a first set of incrementally spaced transparent conductors on one interior face of said cell in spaced orthogonal relationship to a second set of incrementally spaced conductors on the opposite parallel interior other face of said cell;
   b. completing an electrical energizing circuit between only a preselected one of said first set of conductors and a preselected one of said second set of conductors; and
   c. maintaining the voltage difference between said preselected conductors at a magnitude greater than the half voltage required to cause turbulence of the liquid crystal material only in the projective intersection volume of said energized conductors to thereby cause turbulence at a plurality of other points along the length of each of said energized conductors by cross coupling.

* * * * *